(12) United States Patent
Hsieh et al.

(10) Patent No.: US 8,423,995 B2
(45) Date of Patent: *Apr. 16, 2013

(54) ELECTRONIC DEVICE AND USER INTERFACE DISPLAY METHOD THEREOF

(75) Inventors: Wei-Ting Hsieh, Taoyuan County (TW);
Tai-Ling Lu, Taoyuan County (TW);
Yih-Feng Kao, Taoyuan County (TW)

(73) Assignee: HTC Corporation, Taoyuan County (TW)

(*) Notice: Subject to any disclaimer, the term of this patent is extended or adjusted under 35 U.S.C. 154(b) by 974 days.

This patent is subject to a terminal disclaimer.

(21) Appl. No.: 12/424,529

(22) Filed: Apr. 15, 2009

(65) Prior Publication Data
US 2009/0271783 A1 Oct. 29, 2009

Related U.S. Application Data

(60) Provisional application No. 61/048,219, filed on Apr. 27, 2008.

(51) Int. Cl.
*G06F 9/445* (2006.01)
*G06F 9/44* (2006.01)

(52) U.S. Cl.
USPC ............... 717/178; 717/177; 709/203

(58) Field of Classification Search .......... 717/175–178; 715/700–701; 709/203–204
See application file for complete search history.

(56) References Cited

U.S. PATENT DOCUMENTS

| | | | |
|---|---|---|---|
| 5,923,885 A * | 7/1999 | Johnson et al. | 717/176 |
| 6,347,398 B1 * | 2/2002 | Parthasarathy et al. | 717/178 |
| 7,028,295 B2 * | 4/2006 | Li et al. | 717/178 |
| 7,096,465 B1 * | 8/2006 | Dardinski et al. | 717/178 |
| 7,140,013 B2 * | 11/2006 | Te'eni et al. | 717/173 |
| 7,290,285 B2 * | 10/2007 | McCurdy et al. | 726/27 |
| 7,298,851 B1 | 11/2007 | Hendricks et al. | |
| 7,454,463 B2 * | 11/2008 | Raguseo et al. | 709/203 |

(Continued)

FOREIGN PATENT DOCUMENTS

| | | |
|---|---|---|
| CN | 101122841 | 2/2008 |
| TW | 200511200 | 3/2005 |

OTHER PUBLICATIONS

Cheah et al, "An e book personalization architecture with digital rights and encryption procedures", IEEE, pp. 1222-1227, 2010.*
Kuroiwa et al, "Dynamic personalization for book recommendation system using web services and virtual library enchancements", IEEE, pp. 212-217, 2007.*

(Continued)

*Primary Examiner* — Anil Khatri
(74) *Attorney, Agent, or Firm* — Jianq Chyun IP Office

(57) ABSTRACT

An electronic device and a user interface display method thereof are provided. The electronic device organizes a plurality of computer programs executable on the electronic device into a virtual book. Each page of the virtual book includes a user interface of one of the computer programs. The electronic device displays one of the pages as a current page so that the user interface of the current page is accessible to a user of the electronic device. The electronic device senses movement and/or pressure caused by the user and interprets the movement and/or the pressure as operating actions of the user on the virtual book. The electronic device downloads new computer programs from a download server and adds corresponding new pages into the virtual book. At lease one of the computer programs provides a service of a corporate operator of a wireless service network.

14 Claims, 16 Drawing Sheets

U.S. PATENT DOCUMENTS

| | | | | |
|---|---|---|---|---|
| 7,467,380 B2 * | 12/2008 | Kurlander et al. | | 717/174 |
| 7,536,686 B2 * | 5/2009 | Tan et al. | | 717/174 |
| 7,600,228 B2 * | 10/2009 | Takekawa et al. | | 717/178 |
| 7,707,573 B1 * | 4/2010 | Marmaros et al. | | 717/178 |
| 7,757,234 B2 * | 7/2010 | Krebs | | 718/101 |
| 7,778,994 B2 * | 8/2010 | Raman et al. | | 707/706 |
| 7,865,567 B1 * | 1/2011 | Hendricks et al. | | 709/214 |
| 7,970,827 B1 * | 6/2011 | Cumberbatch et al. | | 709/204 |
| 8,074,217 B2 * | 12/2011 | James et al. | | 717/175 |
| 8,185,842 B2 * | 5/2012 | Chang et al. | | 715/776 |
| 8,191,060 B2 * | 5/2012 | Malasky et al. | | 717/175 |
| 8,286,159 B2 * | 10/2012 | Shapiro | | 717/177 |
| 8,291,408 B1 * | 10/2012 | Czymontek | | 717/178 |
| 8,341,210 B1 * | 12/2012 | Lattyak et al. | | 709/203 |
| 2003/0061101 A1 | 3/2003 | Seet et al. | | |
| 2003/0181242 A1 | 9/2003 | Lee et al. | | |
| 2006/0103629 A1 | 5/2006 | Seet et al. | | |

OTHER PUBLICATIONS

Chignell et al, "Information visualization and interactive querying for online documentation and electronic books", IBM Press ACM CASCON, pp. 1011-1020, 1993.*

Wilson et al, "Evaluating the usability of portable electronic books", ACM 564-568, 2003.*

Beer et al, "Smart books adding context awareness and interaction to electronic books", ACM MoMM, pp. 218-222, 2011.*

Geisler et al, "Creating virtual collections in digital libraries: benefits and implementations issues", ACM JCDL, pp. 210-218.*

"First Office Action of China Counterpart Application", issued on Jul. 2, 2010, p. 1-p. 6.

"Office Action of Taiwan Counterpart Application", issued on Oct. 22, 2012, p. 1-p. 7.

* cited by examiner

ELECTRONIC DEVICE AND USER INTERFACE DISPLAY METHOD THEREOF

CROSS-REFERENCE TO RELATED APPLICATION

This application claims the priority benefit of U.S. provisional application Ser. No. 61/048,219, filed Apr. 27, 2008. The entirety of the above-mentioned patent application is hereby incorporated by reference herein and made a part of this specification.

BACKGROUND OF THE INVENTION

1. Field of the Invention

The present invention relates to an electronic device. More particularly, the present invention relates to a book-like user interface of the electronic device.

2. Description of the Related Art

Modern handheld electronic devices, such as mobile phones, smart phones, and personal digital assistants (PDAs), have operating systems whose user interfaces (UIs) are comparable to those of desktop personal computers (PCs). The UI of a handheld electronic device provides various functions and services to its user. Some of the functions and services are very popular and frequently used, such as web surfing, web searching, taking photos, displaying images and pictures, electronic map, calculator, dictionary, organizing contact information, and telephone communication.

Generally, these functions and services are accessible to users in the form of standalone applications, convenient widgets, or web pages. For beginners and casual users with little experiences of modern handheld electronic devices, the variety and complexity of the UI may appear confusing, even daunting. For example, some of the applications and widgets are located on a desktop area of the UI. Some of the applications and widgets are located on pop-up or pull-down menus. Some services are provided as web pages which have to be selected from the bookmarks of a web browser. Sometimes this distributed nature of the functions and services is irritating even to experienced users. Moreover, the operating actions required for starting a widget, an application, and a web page may be very different. The operating actions required to start an application on the desktop may be different from the operating actions required to start an application on a menu. Some applications and widgets may be assigned to deeply nested menus, which are unobtrusive and difficult to find. All of these add to the difficulty and confusion of using the UI of a handheld electronic device.

SUMMARY OF THE INVENTION

Accordingly, the present invention is directed to a user interface display method for an electronic device. For example, the electronic device may be a handheld electronic device. The user interface display method displays a book-like UI of the handheld electronic device. New computer programs may be downloaded from a download server and be added as new pages into the book-like UI.

The present invention is also directed to another user interface display method for an electronic device. The user interface display method displays a book-like UI of the handheld electronic device. At least one of the pages of the virtual UI book provides a service of a corporate operator of a wireless service network.

The present invention is also directed to electronic devices which execute the aforementioned user interface display methods to display the book-like UI.

According to an embodiment of the present invention, a user interface display method for an electronic device is provided. The method includes the following steps. First, a plurality of computer programs executable on the electronic device into a virtual book are organized. Each page of the virtual book includes a user interface of one of the computer programs. Next, a new computer program from a download server is downloaded and a new page into the virtual book is added. The new page includes a user interface of the new computer program. Next, the new page is displayed so that the user interface of the new page is accessible to a user of the electronic device.

The step of downloading the new computer program may include the following steps. First, the download server is connected. Next, a plurality of virtual objects is displayed. Each of the virtual objects represents a downloadable computer program stored in the download server. In response to a first operating action of the user on one of the virtual objects, download the downloadable computer program represented by that particular virtual object as the new computer program.

The virtual objects may be displayed on one of the pages of the virtual book. In addition, each of the virtual objects may be displayed in the form of a card of a library catalog and the cards may be arranged as a card stack. Additional classification cards may be displayed in the card stack. The classification cards organize the cards in the stack into a plurality of categories.

At least one of the virtual objects includes a summary introduction of the corresponding downloadable computer program and a preview of the user interface of the corresponding downloadable computer program. The user interface display method may further include displaying a full-screen view of the user interface of the corresponding downloadable computer program in response to a second operating action of the user on the preview.

The virtual object including the summary introduction and the preview may further include a download button and the aforementioned first operating action of the user may be performed on the download button.

The aforementioned new page may be a classification page including a plurality of entries and each of the entries may represent one of the pages between the classification page and another classification page or a bottom cover of the virtual book. In response to a third operating action of the user on one of the entries, the virtual book may turn to the page represented by that particular entry.

According to an embodiment of the present invention, a user interface display method for an electronic device is provided. The method includes the following steps. First, organize a plurality of computer programs executable on the electronic device into a virtual book. At lease one of the computer programs provides a service of a corporate operator of a wireless service network. Each page of the virtual book includes a user interface of one of the computer programs. Next, display one of the pages as a current page so that the user interface of the current page is accessible to a user of the electronic device.

The service of the corporate operator may include displaying advertisements pushed from the corporate operator on the virtual book. The advertisements may be updated at predetermined time intervals.

The computer program providing the service of the corporate operator may be downloaded from the aforementioned download server.

According to another embodiment of the present invention, an electronic device is provided. The electronic device includes a touch panel and a display. The electronic device organizes a plurality of computer programs executable on the electronic device into a virtual book. Each page of the virtual book includes a user interface of one of the computer programs. The electronic device senses movement and/or pressure caused by a user of the electronic device on the touch panel and interprets the movement and/or the pressure as operating actions of the user on the virtual book. Moreover, the electronic device downloads a new computer program from a download server and adds a new page into the virtual book. The new page includes a user interface of the new computer program. The electronic device displays the new page on the display so that the user interface of the new page is accessible to the user.

According to another embodiment of the present invention, an electronic device is provided. The electronic device includes a touch panel and a display. The electronic device organizes a plurality of computer programs executable on the electronic device into a virtual book. At lease one of the computer programs provides a service of a corporate operator of a wireless service network. Each page of the virtual book includes a user interface of one of the computer programs. The electronic device displays one of the pages as a current page on the display so that the user interface of the current page is accessible to a user of the electronic device. In addition, the electronic device senses movement and/or pressure caused by the user on the touch panel and interprets the movement and/or the pressure as operating actions of the user on the virtual book.

The user may operate this UI through a touch panel of the handheld electronic device. The control mechanism connecting the operating actions of the user on the touch panel and the displayed book-like UI may be provided by the hardware or software of the handheld electronic device.

The book-like UI proposed by the present invention unifies applications, widgets, and web pages into book pages, enabling the user to browse, use, and manage the functions and services in an intuitive and convenient way like browsing a conventional printed book. By using the book-like UI, the user does not have to worry about whether a function or service is provided by a widget, an application, or a web page because the operating actions for using and managing them are all the same. Furthermore, the problem of unobtrusive nestled menus no longer exists because the book pages are on the same level and the only level of display.

The user may operate the book-like UI by touching or sliding on the touch panel with his or her finger. Since the touch panel is integrated on the handheld electronic device, the user may operate on the device directly. The handheld electronic device of the present invention is compact and is able to receive the operation of the user and display the book-like UI simultaneously. The handheld electronic device does not need a separate external input device for receiving user operation.

BRIEF DESCRIPTION OF THE DRAWINGS

The accompanying drawings are included to provide a further understanding of the invention, and are incorporated in and constitute a part of this specification. The drawings illustrate embodiments of the invention and, together with the description, serve to explain the principles of the invention.

DESCRIPTION OF THE EMBODIMENTS

Figure 1A:
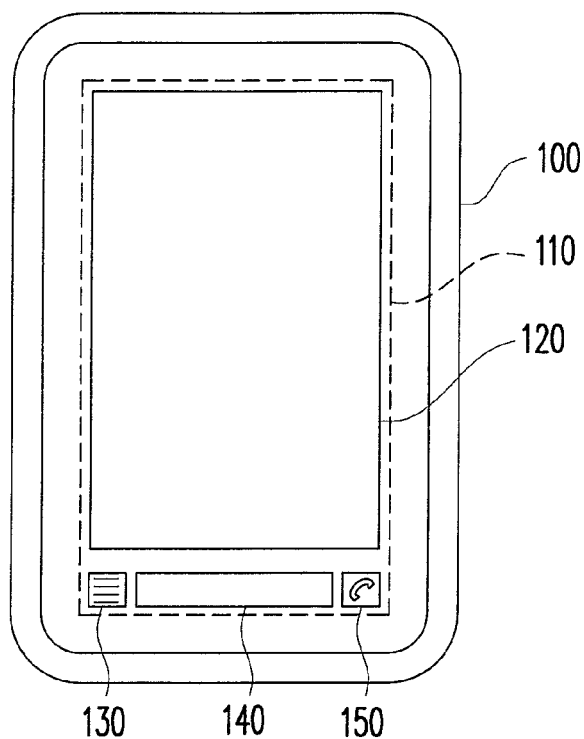
FIG. 1A and FIG. 1B are schematic diagrams showing arrangement of touch panels on handheld electronic devices according to various embodiments of the present invention.

Reference will now be made in detail to the present embodiments of the invention, examples of which are illustrated in the accompanying drawings. Wherever possible, the same reference numbers are used in the drawings and the description to refer to the same or like parts.

The book-like UI of a handheld electronic device proposed by the present invention organizes applications, widgets, and web pages into pages of a virtual book. Each page of the virtual book is the UI of a service or function of the handheld electronic device. Flipping the pages of the virtual book means browsing and selecting the services and functions provided by the handheld electronic device. This book-like UI enables the user to use and manage these applications, widgets, and web pages in an easy and intuitive way like browsing a conventional printed book. The book-like UI hides the differences among applications, widgets, and web pages so that the handheld electronic device can be accessed through a uniform and convenient UI.

FIG. 1A is a schematic diagram showing a handheld electronic device with the book-like UI according to an embodiment of the present invention. The handheld electronic device in FIG. 1A includes a casing 100, a touch panel 110, and a display 120. The touch panel 110 not only covers the display 120 but also extends beyond the boundary of the display 120. The extended portion of the touch panel 110 may be located on the upper side, lower side, right side, or left side of the display 120. In FIG. 1A, it is the lower side on which the extended portion is located. The extended portion of the touch panel 110 includes a flip bar 140 and two buttons 130 and 150. The user may slide one of his/her fingers on the flip bar 140 or press the buttons 130 and 150. The handheld electronic device senses the movement on the flip bar 140 and the pressure on the buttons 130 and 150 through the touch panel 110, and then interpret the movement and pressure into operating actions of the user for the book-like UI. Since the touch panel 110 can also sense pressure and movement on the display 120, in some other embodiments of the present invention the operating actions may be performed on the display 120 as well.

Figure 1B:
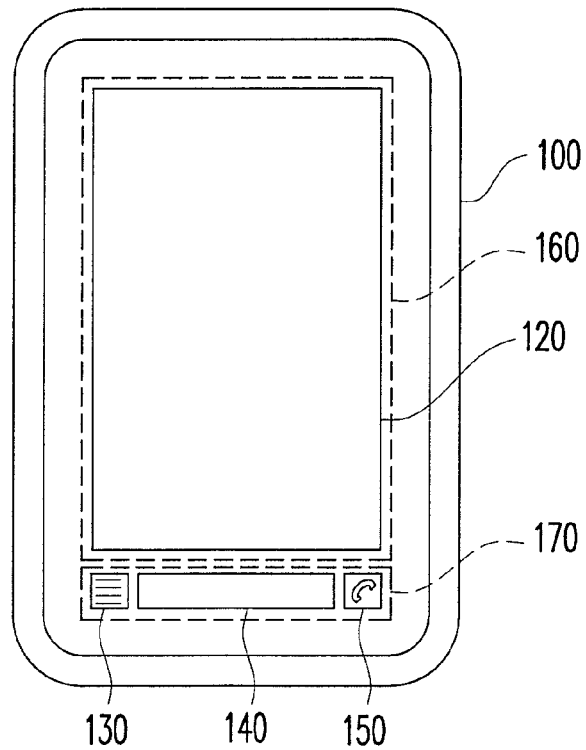

FIG. 1B is a schematic diagram showing a design variation of the handheld electronic device in FIG. 1A according to another embodiment of the present invention. The handheld electronic device in FIG. 1B includes two touch panels 160 and 170. The touch panel 160 has the same dimensions as those of the display 120 and the touch panel 160 covers the display 120. The touch panel 170 is separate from the touch panel 160 and is located on one side of the touch panel 160. The touch panel 170 includes the flip bar 140 and the buttons 130 and 150. Except the differences mentioned above, the handheld electronic device in FIG. 1B is identical to the handheld electronic device in FIG. 1A.

Figure 2:
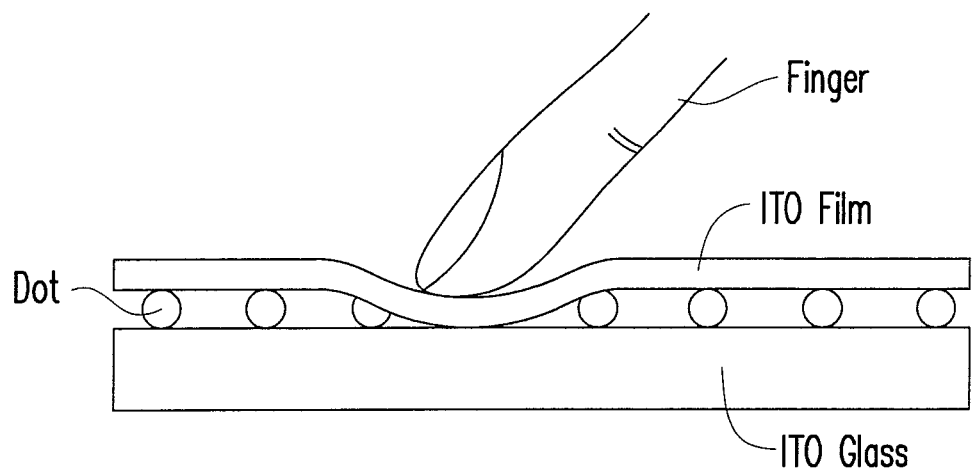
FIG. 2 is a schematic diagram illustrating a conventional resistive touch panel.
Figure 3:
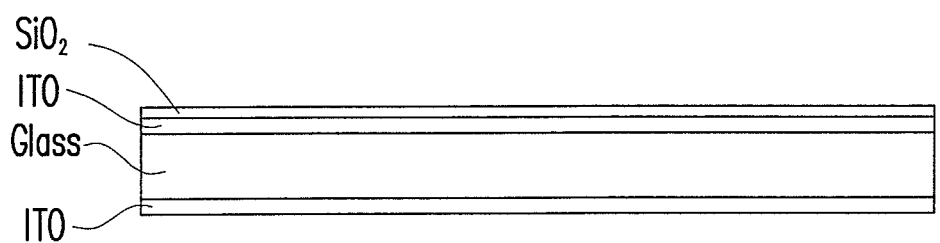
FIG. 3 is a schematic diagram illustrating a conventional capacitive touch panel.

Each one of the touch panels 110, 160, and 170 may be a resistive touch panel as shown in FIG. 2 or a capacitive touch panel as shown in FIG. 3. A resistive touch panel consists of an indium tin oxide (ITO) film, ITO glass, and some dot spacers (DOT) in between. When a finger or stylus touches the ITO film, the ITO film contacts with the ITO glass and generates voltage variation. The handheld electronic device converts the voltage variation from analog signals into digital signals and then processes the digital signals to obtain the (X, Y) position of the touch. In this way the handheld electronic device can detect the touch and movement of the finger or stylus on the resistive touch panel. On the other hand, a capacitive touch panel consists of silicon oxide ($SiO_2$), ITO, and glass, as shown in FIG. 3. A smooth electric field is established on the surface of the glass. When the finger or stylus contacts with the ITO, the variation of the electric field is detected by four sensors disposed at the four corners of the capacitive touch panel in order to locate the contact.

The purpose of the flip bar 140 is separating operating actions for flipping the virtual book from operating actions for the UI of a book page. Operating actions on the display 120 control the current book page, while operating actions on the flip bar 140 flip the virtual book. For example, assume a book page is an application for browsing photos. The user may turn to the next photo by a rapid stroke with his/her finger on the display 120. The user may flip to the next book page (switch to the next function or service of the handheld electronic device) by the same rapid stroke on the flip bar 140. The same action by the user is interpreted into different events according to the area in which the action is performed. If the next book page is a music channel broadcast service, the same rapid stroke on the display 120 may mean switching to the next music channel, while the same rapid stroke on the flip bar 140 still means flipping to the next book page of the virtual book.

In another embodiment of the present invention, both the operating actions for the current book page and the operating actions for flipping the virtual book may be performed on the display 120. In this case, these two classes of operating actions can no longer share the same action. For example, the operating actions for switching to the next music channel and flipping to the next virtual book page have to be different. The difference may be implemented as the existence or non-existence of a brief pause. If the finger slides rapidly without a pause or with a pause shorter than a predetermined duration, this action is interpreted as flipping the virtual book. If the finger pauses for longer than the predetermined duration and then slides rapidly, this action is interpreted as switching to the next music channel. In this embodiment the handheld electronic device does not need a separate flip bar 140. However, such a design limits the option of operating actions available to a virtual book page because some operating actions must be assigned to the virtual book flipping.

In additional to a finger, the user may also use a stylus to perform any operating action for the book-like UI mentioned above or below. Since the display, the touch panel, the flip bar, and the buttons are all integrated on the compact handheld electronic device, the user may operate by touching the display or the flip bar directly without the need for a separate input device for receiving user operation.

Figure 4A:
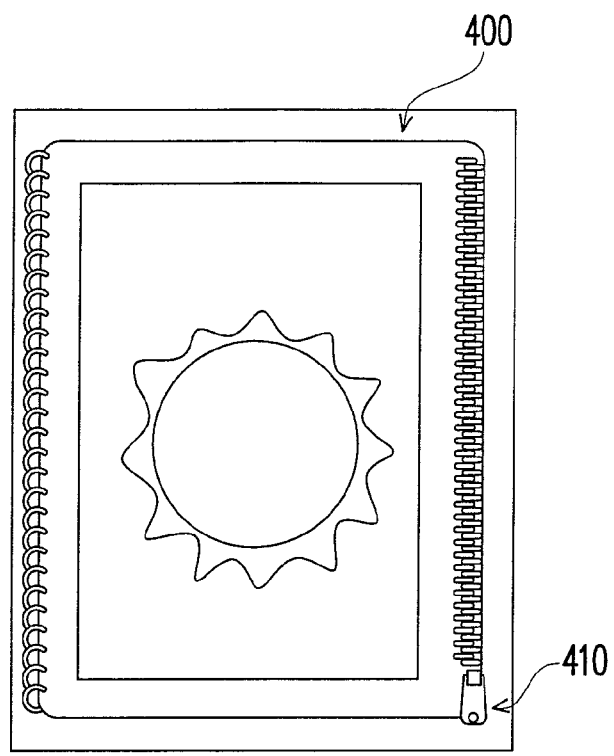
FIG. 4A and FIG. 4B are schematic diagrams showing a virtual book displayed by a handheld electronic device according to an embodiment of the present invention.
Figure 4B:
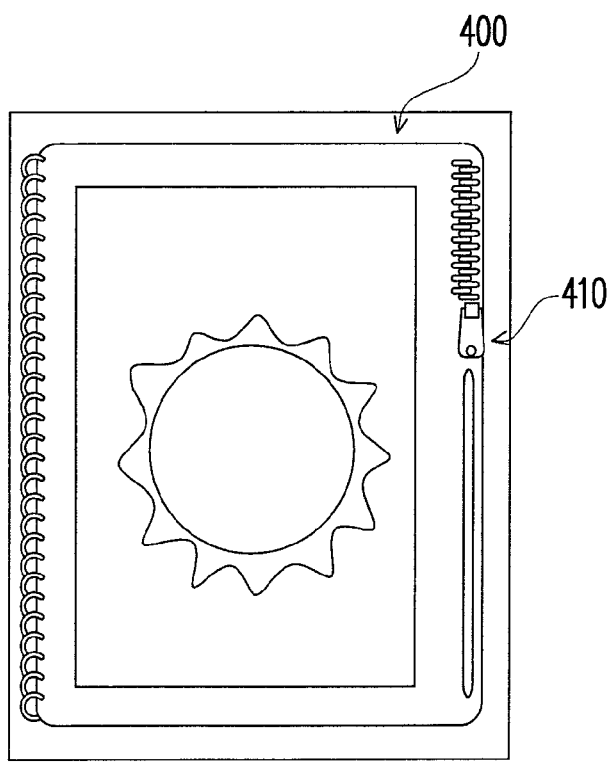

When the handheld electronic device is idle, it displays an idle screen as shown in FIG. 4A. The idle screen shows a virtual book 400 in a zoom-out view including the cover and the thickness of the virtual book 400. The virtual book 400 is a loose-leaf notebook with a zipper 410. The zipper 410 represents a screen lock function. The user may drag the slider of the zipper 410 with a finger sliding along the zipper 410 on the display 120. When the slider of the zipper 410 is dragged to the bottom as shown in FIG. 4A, the handheld electronic device is under a screen lock. The user may drag the slider of the zipper 410 to the top, as shown in FIG. 4B, to unlock the screen.

Figure 4C:
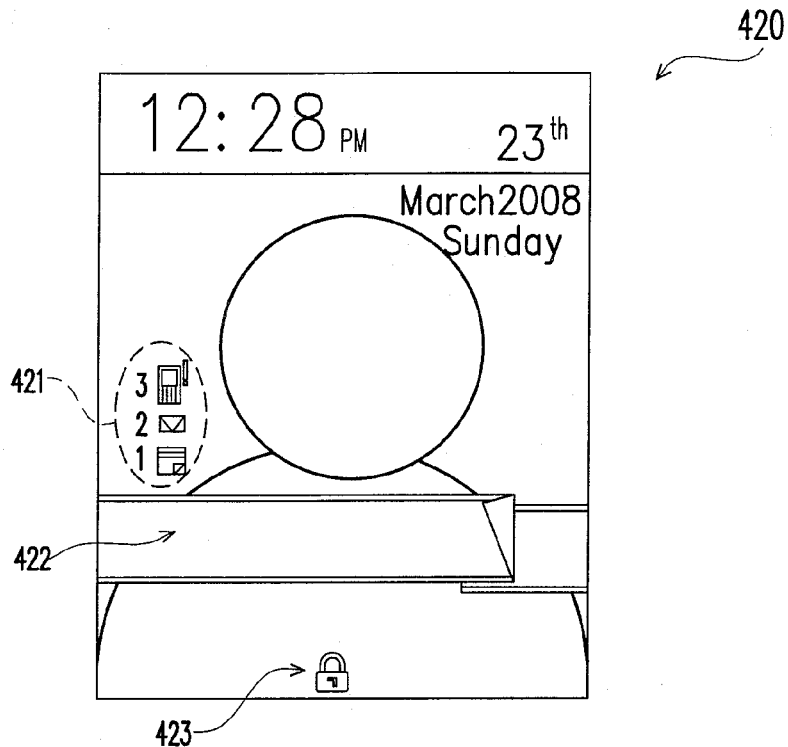
FIGS. 4C-4E are schematic diagrams showing a virtual book displayed by a handheld electronic device according to another embodiment of the present invention.
Figure 4D:
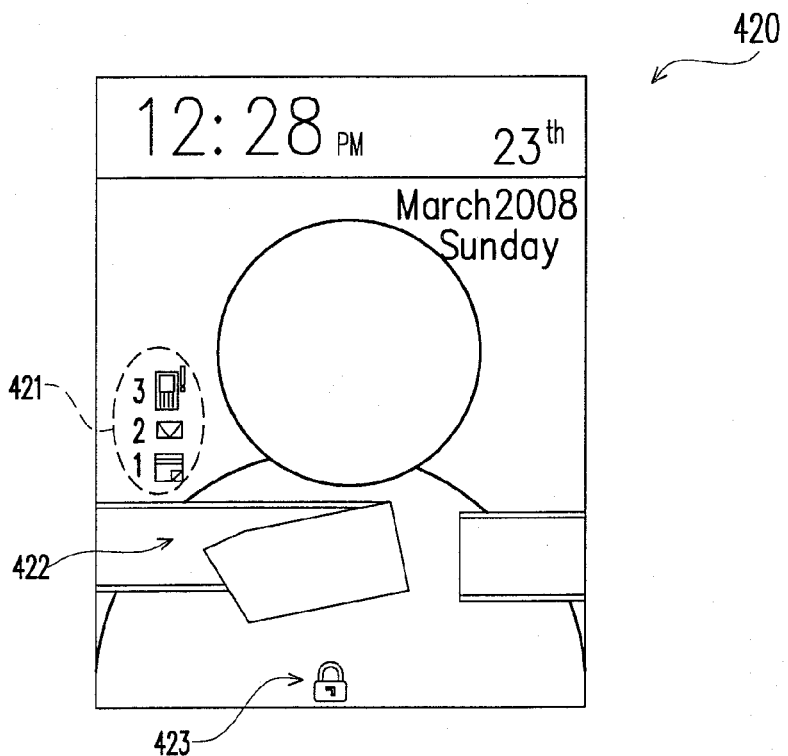
Figure 4E:
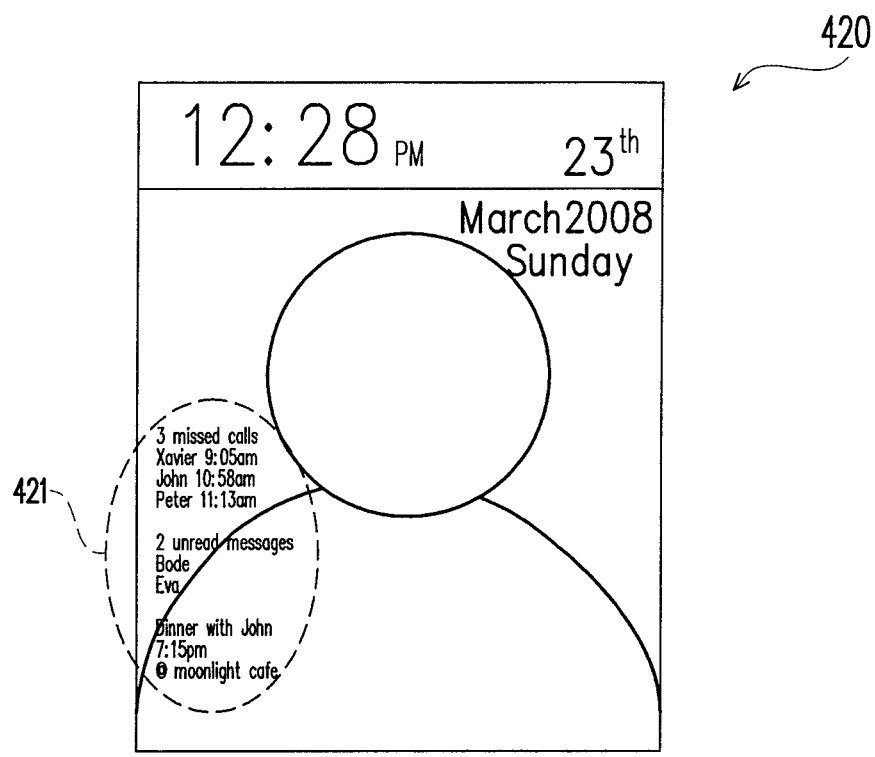

In other embodiments of the present invention, the screen lock may be represented by other images and the screen may be unlocked with various operating actions. FIG. 4C, FIG. 4D, and FIG. 4E illustrate another example of the screen lock function. In FIGS. 4C-4E, the virtual book 420 is rendered in the form of a magazine. The cover of the magazine shows the current date and the current time. The area 421 shows that there are three missed telephone calls, two unread messages, and one schedule notification. The presence of the ribbon 422 and the padlock 423 means that the screen is locked. The user may unlock the screen by a horizontal long slide of the finger along the ribbon 422. After the horizontal long slide, the ribbon 422 is untied, as shown in FIG. 4D. After a predetermined brief duration, the ribbon 422 and the padlock 423 disappear, as shown in FIG. 4E, which means the screen is unlocked. The area 421 in FIG. 4E displays more detailed summary of the missed calls, unread messages and schedule notification.

Figure 5A:
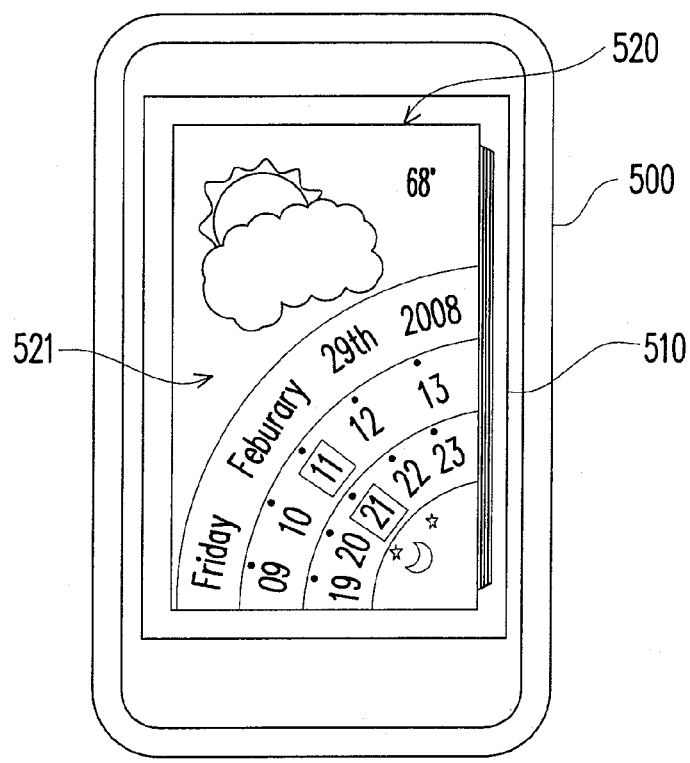
FIGS. 5A-5D are schematic diagrams showing a book-like UI of a handheld electronic device according to an embodiment of the present invention.
Figure 5B:
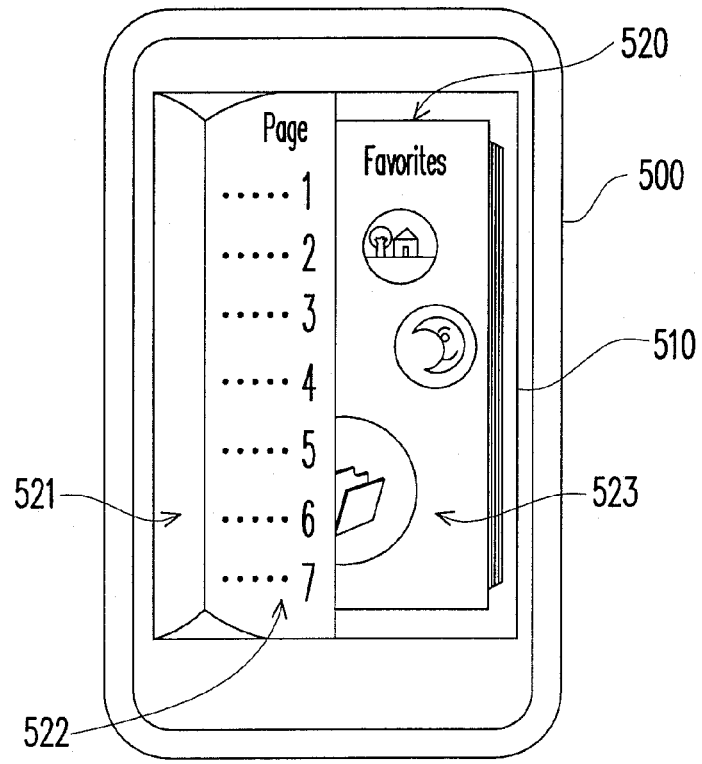
Figure 5C:
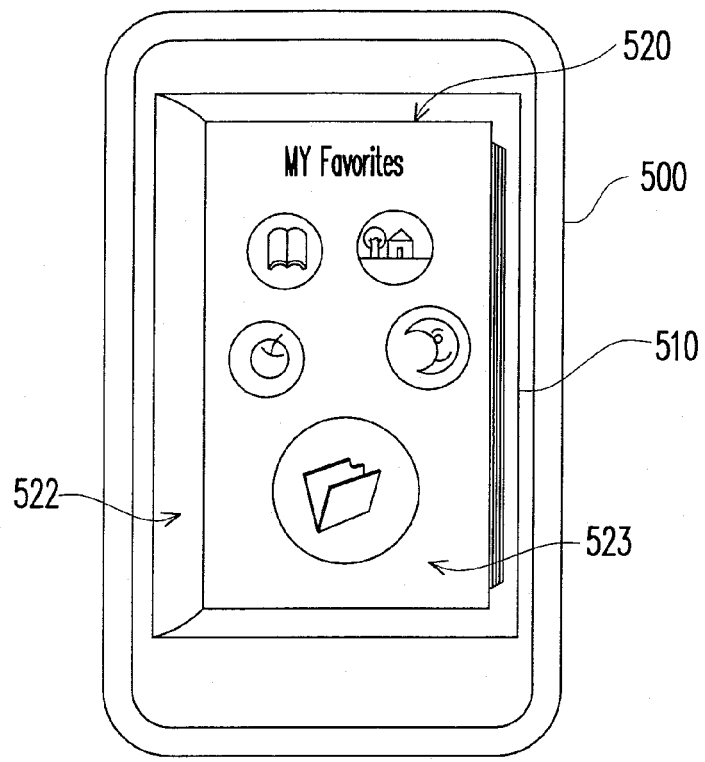
Figure 5D:
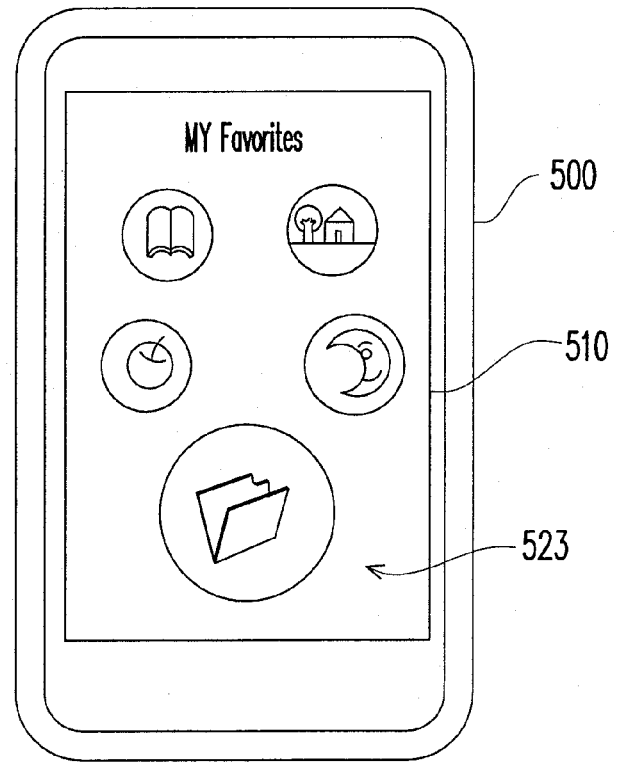

FIG. 5A is a schematic diagram showing a handheld electronic device 500 according to another embodiment of the present invention. For simplicity, the touch panel is not shown in FIG. 5A. A virtual book 520 and its cover page 521 are shown in the zoom-out view on the display 510 of the handheld electronic device 500. When the user flips the cover page 521 (details later), as shown in FIG. 5B, at first the handheld electronic device 500 displays the cover page 521, the table-of-contents (TOC) page 522, and the first book page 523 of the virtual book 520 at the same time. The cover page 521 is fully flipped and the TOC page 522 is partially flipped. The first book page 523 is partially obscured. Next, as shown in FIG. 5C, the TOC page 522 becomes fully flipped and the first book page 523 is fully revealed. Next, as shown in FIG. 5D, the first book page 523 is displayed in a zoom-in view and occupies the entire display 510. The zoom-in view provides a clearer view to the user so that the user can focus on the function or service of the current book page.

From the first book page 523, the user may flip the virtual book 520 to the next page or to the previous page. The flow is similar to that shown in FIGS. 5A-5D except that only one page is turned over. When the user is using a book page, this current book page is displayed in the zoom-in view. When the user flips the current book page, as shown in FIGS. 5A-5D, the animation of flipping the virtual book is displayed in the zoom-out view until the flipping is finished, and then the destination page is displayed in the zoom-in view.

Figure 6:
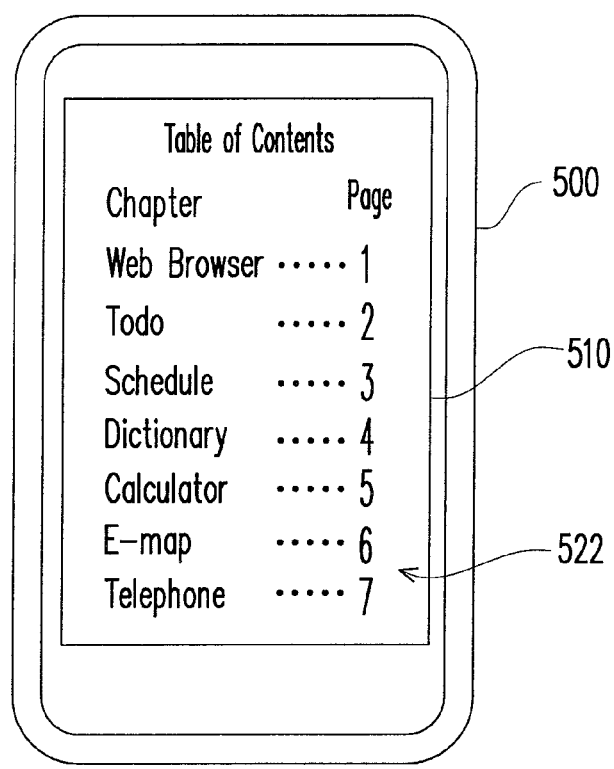
FIG. 6 is a schematic diagram showing a table-of-contents page in the book-like UI in FIGS. 5A-5D.

If the user flips from the first book page 523 to its previous book page, the TOC page 522 is displayed as shown in FIG. 6. The TOC page 522 lists all book pages of the virtual book 520. The user may turn to any page immediately by clicking the list entry corresponding to the desired book page with a finger.

The handheld electronic device 500 may provide a preference option for the user to determine the destination page when the user flips the cover page 521 of the virtual book 520. According to the preference option, the destination page may be the TOC page 522, the first book page 523, or a book page other than the first book page 523 predetermined by the user.

The user may flip the pages of the virtual book by sliding a finger on the display or the flip bar of the handheld electronic device. In this embodiment, a finger slide is classified into a slow slide or a fast slide according to its speed. If a finger moves with a speed lower than a predetermined speed threshold, it is classified as a slow slide. If a finger moves with a speed higher than the predetermined speed threshold, it is classified as a fast slide. A fast slide is further classified as a fast short slide or a fast long slide according to its distance. If the distance of a fast slide is shorter than a predetermined distance threshold, it is classified as a fast short slide. If the distance of a fast slide is longer than the predetermined distance threshold, it is classified as a fast long slide. The following Table 1 summarizes the classification of finger slides.

TABLE 1

Finger slide classification according to speed and distance

|  | Short distance | Long distance |
| --- | --- | --- |
| Low speed | Slow slide | |
| High speed | Fast short slide | Fast long slide |

The flipping of the pages of the virtual book is classified into two types, single flipping and continuous flipping. The user may perform a single flipping with a fast slide and performs a continuous flipping with a slow slide.

In a single flipping, the user flips the virtual book from the current page to a destination page. The flipping animation shows only the current page being flipped, as shown in FIG. 5B. No matter how many pages are actually between the current page and the destination page, the intervening pages are simply skipped over. As shown in the following Table 2, there are three rules for the single flipping. The handheld electronic device may implement any one of the three rules. Rule 1 is the simplest, in which a fast slide always flips one book page. In rule 2, a fast short slide flips only one book page and a fast long slide flips a predetermined number of book pages. The predetermined number may be set by the user. For example, a fast long slide may flip 5 or 10 pages of the virtual book. In rule 3, a fast short slide flips only one book page and a fast long slide flips a number of book pages proportional to the slide distance.

TABLE 2

Rules of single flipping

| Rule 1 | Rule 2 | Rule 3 |
| --- | --- | --- |
| A fast slide always flips one book page. | A fast short slide flips one book page. A fast long slide flips a predetermined number of book pages. | A fast short slide flips one book page. A fast long slide flips a number of book pages proportional to the slide distance. |

Figure 7:
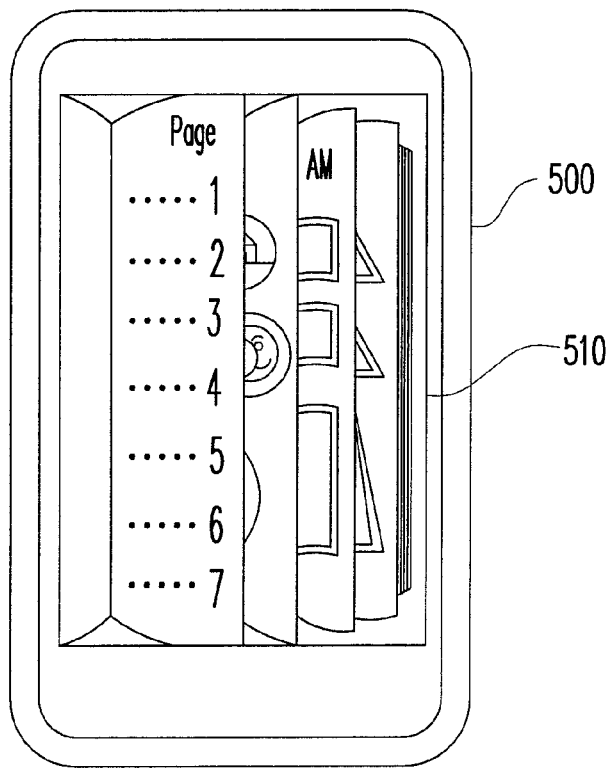
FIG. 7 is a schematic diagram showing the flipping of book pages in the book-like UI in FIGS. 5A-5D.

In a continuous flipping, several book pages are flipped at the same time as a slow slide of the user moves across the flip bar. The flipping continues until the user reaches the desired destination page and stops the slow slide. The flipping animation shows all the pages being flipped, as shown in FIG. 7. There are three rules for the continuous flipping as summarized in the following Table 3. In rule 1, a book page is flipped each time when the finger slides across a predetermined number of pixels on the flip bar. For example, this predetermined number may be 60 pixels. In this case, one book page is flipped when a finger of the user slides across 60 pixels on the flip bar. Two book pages are flipped when the finger slides across 120 pixels on the flip bar, and so on. The number of book pages being flipped is proportional to the number of pixels the slow slide passes.

In rule 2, the first book page is flipped when the finger slides across a first predetermined number of pixels on the flip bar, and then a following book page is flipped each time when the finger slides across a second predetermined number of pixels on the flip bar. For example, the first predetermined number may be 60 pixels and the second predetermined number may be 15 pixels. In this case, the second and the latter book pages are flipped faster in rule 2 than they are in rule 1.

In both rule 1 and rule 2 of the continuous flipping, when the finger of the user reaches an end of the flip bar, the continuous flipping may simply stop. If the user wants to continue flipping in this case, he/she has to perform another slow slide across the flip bar. Alternatively, the flipping may continue when the finger of the user reaches one end of the flip bar.

In rule 3, the flip bar is used like a scroll bar. The ratio of the number of book pages being turned to the total number of book pages is equal to the ratio of the distance of the slow slide to the total length of the flip bar.

TABLE 3

Rules of continuous flipping

| Rule 1 | Rule 2 | Rule 3 |
| --- | --- | --- |
| Flip a page each time when the finger slides across a predetermined number of pixels on the flip bar. | Flip a page when the finger slides across a first predetermined number of pixels on the flip bar, and then flip a page each time when the finger slides across a second predetermined number of pixels on the flip bar. | The flip bar is used like a scroll bar. |

In addition to the "forward" continuous flipping discussed above, the handheld electronic device may also support "backward" continuous flipping. After a forward continuous flipping, the user may perform a backward continuous flipping by slowly sliding a finger in a direction opposite to the direction of the previous forward continuous flipping. The backward continuous flipping can be used to return to the desired book page when the user accidentally flips too many pages with the forward continuous flipping. There are two rules for the backward continuous flipping as summarized in the following Table 4.

TABLE 4

Rules of backward continuous flipping

| Rule 1 | Rule 2 |
|---|---|
| Flip a page each time when the finger slides across a predetermined number of pixels on the flip bar. | Each of the first few pages is flipped when the finger slides across a first predetermined number of pixels on the flip bar. Each of the following pages is flipped when the finger slides across a second predetermined number of pixels on the flip bar. |

In rule 1 of the backward continuous flipping, each time when a finger of the user slides across a predetermined number of pixels on the flip bar, one book page is flipped. For example, this predetermined number may be 25 pixels. In this case, the flipping speed of the backward continuous flipping is slower than that of rule 2 of the forward continuous flipping (15 pixels per page). The reason for the slower speed is that it is easier to find the desired book page at a slower speed.

Rule 2 of the backward continuous flipping implements two different flipping speeds. In rule 2, each of the first few pages is flipped when the finger slides across a first predetermined number of pixels on the flip bar, and each of the following pages is flipped when the finger slides across a second predetermined number of pixels on the flip bar. For example, the first predetermined number may be 25 pixels, the second predetermined number may be 15 pixels, and the first few pages mentioned above may be the first three pages.

In another embodiment of the present invention, the user may flip the book pages by pressing the display or the flip bar of the handheld electronic device with a finger. If the pressure of the finger is lower than a predetermined pressure threshold, it is classified as a light press. If the pressure of the finger is higher than the predetermined pressure threshold, it is classified as a heavy press. The user may perform a single flipping with a light press and a continuous flipping with a heavy press. In the continuous flipping, the flipping speed may be proportional to the pressure. The handheld electronic device senses the contact pressure or the contact area of the finger on the touch panel in order to estimate the pressure of the finger.

The handheld electronic device may include some buttons for rapid switching to predetermined pages of the virtual book. For example, please refer to FIG. 1A. The handheld electronic device in FIG. 1A includes two touch buttons 130 and 150. Touching the button 130 flips the virtual book to the TOC page, while touching the button 150 flips the virtual book to the telephone page. In other embodiments of the present invention, such rapid switching buttons may be assigned to other book pages. The assignment may be default or determined by the user. The number and positions of the rapid switching buttons may be adjusted according to practical requirement. The rapid switching buttons may be physical buttons installed on the casing of the handheld electronic device or virtual touch buttons implemented on the touch panel of the handheld electronic device.

Figure 8:
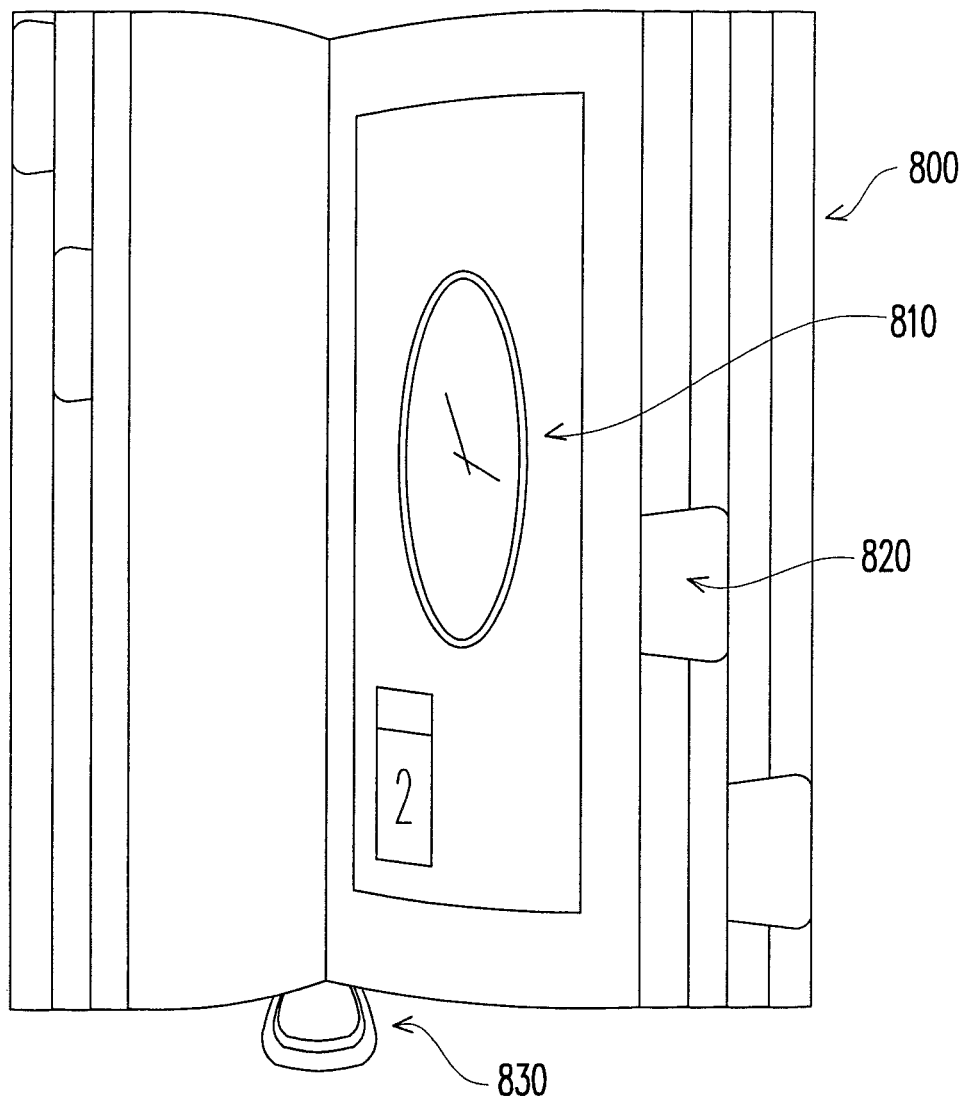
FIG. 8 and FIG. 9 are schematic diagrams showing stand-up views of a virtual book displayed by a handheld electronic device according to an embodiment of the present invention.

The virtual book may be rendered as a loose-leaf notebook which allows the user to adjust the positions of its book pages. Please refer to FIG. 8. The virtual book 800 is a loose-leaf notebook. In order to adjust the position of a book page, the user has to flip to the book page first, and then presses the book page for a predetermined duration. This predetermined duration may be a few seconds. If the current book page is pressed for the predetermined duration, the virtual book is displayed in a stand-up view as shown in FIG. 8. In the stand-up view, the user may press the switch 830 with a finger to unlock the current book page. The unlocked book page becomes a loose leaf 810. The user may drag the loose leaf 810 horizontally with a finger to adjust the position of the loose leaf 810. When the user releases his/her finger, the loose leaf 810 returns to the form of a book page and is attached to the new position.

In addition to moving a book page in the stand-up view, the user may also adjust the position of a book page by dragging the table entry corresponding to the book page in the TOC page.

The book pages with small tabs in the stand-up view in FIG. 8, such as the book page 820, are classification pages. The classification pages are designed for advanced users who need to organize a lot of book pages. Each classification page is a small TOC page including table entries corresponding to all book pages between the classification page and the next classification page or the bottom cover of the virtual book. The classification pages may be rendered with different colors for easier management and identification. Moreover, the user may assign words or messages for identification to the tabs of the classification pages.

In addition to moving book pages in the stand-up view, the user may also perform single flipping and continuous flipping in the stand-up view. Since the stand-up view displays many book pages at the same time, the user may turn to a book page directly by clicking on the book page with a finger.

Figure 9:
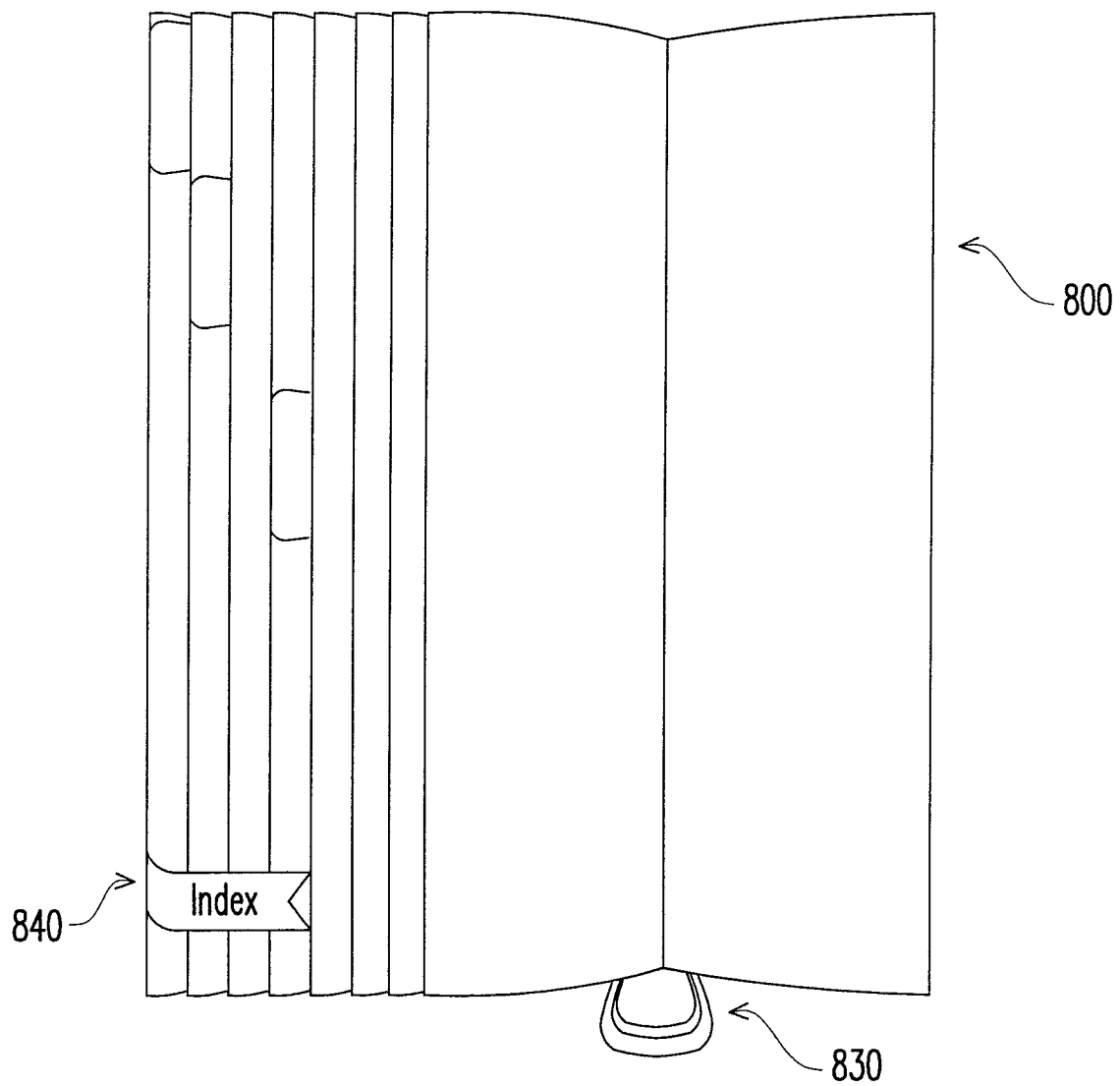

Now please refer to FIG. 9. In FIG. 9, the stand-up view includes an index button 840. The user may press the index button 840 with a finger to turn to the TOC page directly. Alternatively, the user may flip to the TOC page immediately by sliding a finger from the left end of the screen to the right end of the screen or from the right end of the screen to the left end of the screen. In other embodiments of the present invention, a finger slide from the left end of the screen to the right end of the screen may activate a predetermined function other than flipping to the TOC page. Similarly, a finger slide from the right end of the screen to the left end of the screen may activate another different predetermined function.

Figure 10A:
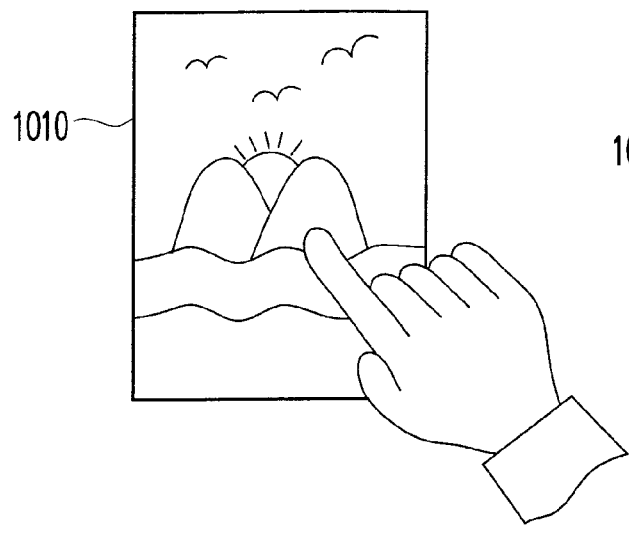
FIGS. 10A-10D are schematic diagrams showing the flow of deleting a book page in the book-like UI of a handheld electronic device according to an embodiment of the present invention.
Figure 10B:
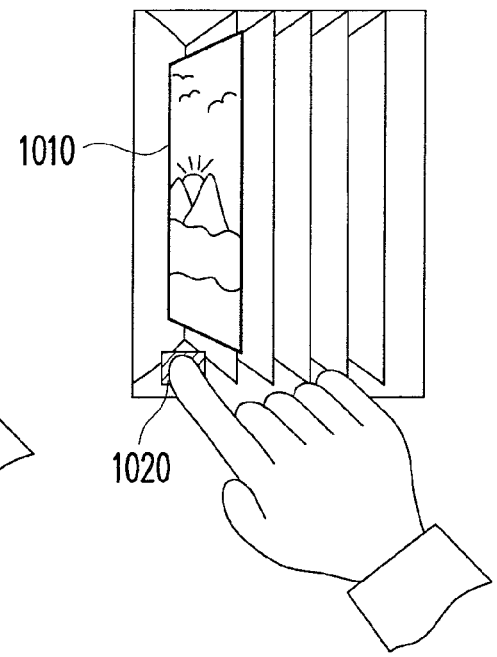
Figure 10C:
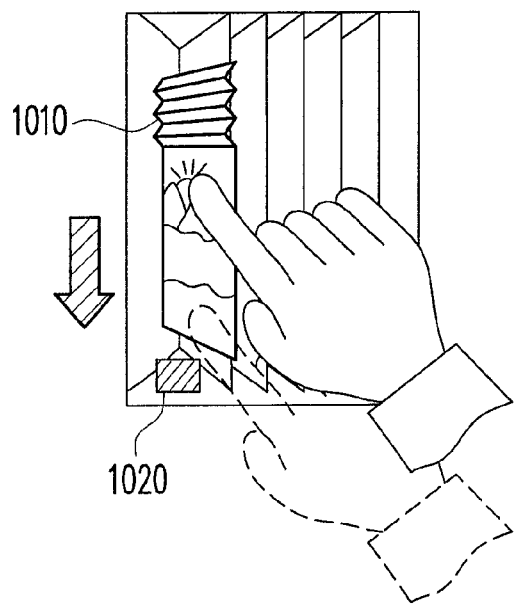
Figure 10D:
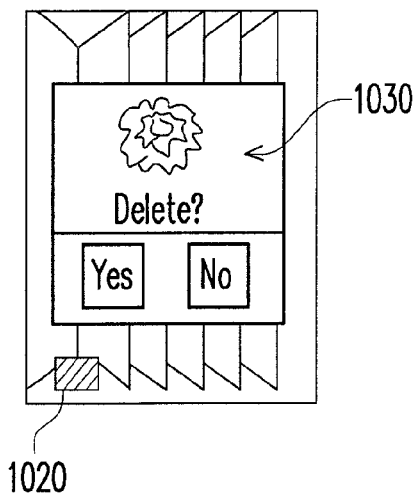

The user may delete a book page in the stand-up view. FIGS. 10A-10D illustrate an exemplary flow of deleting a book page. First, as shown in FIG. 10A, the user flips the virtual book to a book page 1010 and then presses the page 1010 with a finger for a predetermined time duration. If the book page 1010 is pressed for the predetermined time duration, the display changes from the zoom-in view to the stand-up view. Next, the user presses the button 1020 and the book page 1010 becomes a loose leaf, as shown in FIG. 10B. The user may drag the loose leaf 1010 downward with a finger, as shown in FIG. 10C. During the downward drag, the loose leaf 1010 crushes into waste paper. A dialog box 1030 appears to prompt the user to confirm the deletion, as shown in FIG. 10D. If the user selects "Yes" in the dialog box 1030, the book page 1010 is deleted from the virtual book.

For some functions and services provided by the handheld electronic device, the display contents of their book pages may be extracted to become new book pages. For example, the photo currently displayed by a photo browser application may be extracted to become a new book page. This new book page only displays the extracted photo and does not include the other functions of the photo browser. Similarly, the web page currently displayed by a web browser may be extracted to become a new book page. This new book page only accesses the extracted web page.

Figure 11A:
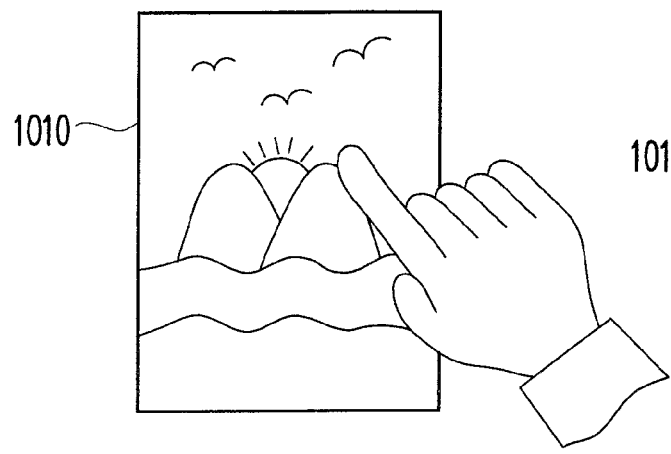
FIGS. 11A-11D are schematic diagrams showing the flow of converting the display contents of a book page into a new page in the book-like UI of a handheld electronic device according to an embodiment of the present invention.
Figure 11B:
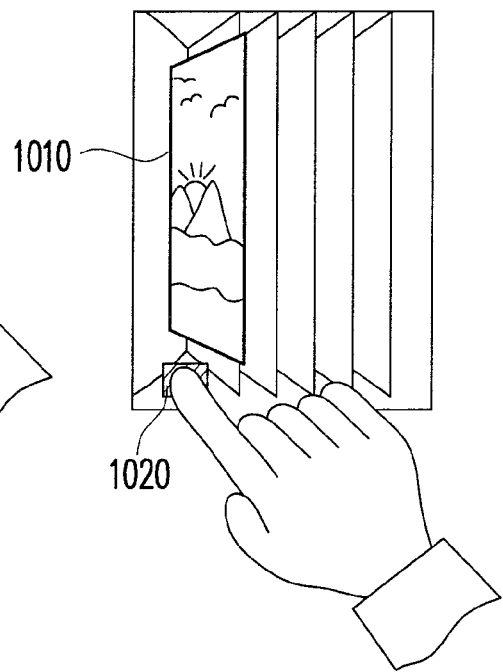
Figure 11C:
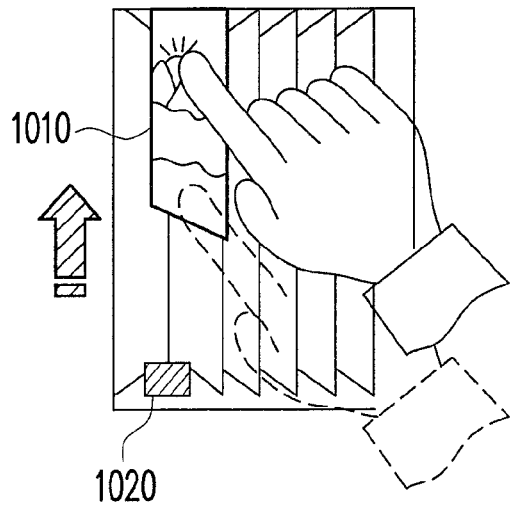
Figure 11D:
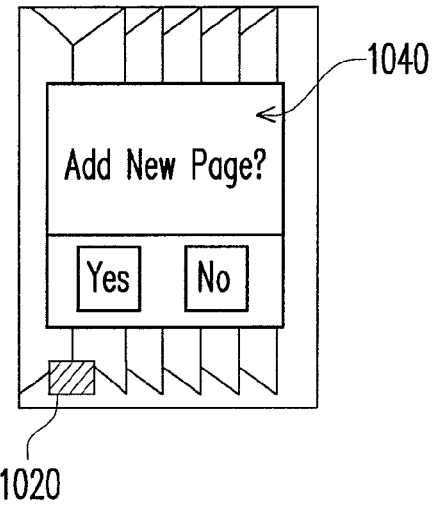

FIGS. 11A-11D illustrate an exemplary flow of adding a new book page by extraction. Assume the current book page 1010 is a photo browser application and the user wants to extract the photo currently being displayed to become a new book page. First, the user presses the current page 1010 for a predetermined time duration, as shown in FIG. 11A. After the user presses the current page 1010 for the predetermined time duration, the display changes from the zoom-in view to the stand-up view. In the stand-up view, the user presses the button 1020 and the current page 1010 becomes a loose leaf, as shown in FIG. 11B. The user may drag the loose leaf 1010 upward with a finger, as shown in FIG. 11C. When the upward drag is complete, a dialog box 1040 appears to prompt the user to confirm the extraction, as shown in FIG. 11D. If the user selects "Yes" in the dialog box 1040, the photo displayed on the book page 1010 becomes a new book page. This new book page may be directly behind the book page 1010. Alternatively, the position of this new book page may be determined by the user. If the book page 1010 is a web browser, the flow of extraction is the same as that illustrated in FIGS. 11A-11D.

Another way to delete or extract a book page is provided in the TOC page of the virtual book. The TOC page may include an "edit" button. When the user presses the edit button, a context menu appears on top of the TOC page. By selecting appropriate functions in the context menu, the user may delete a book page or extract the current display contents of a book page as a new book page.

Figure 12:
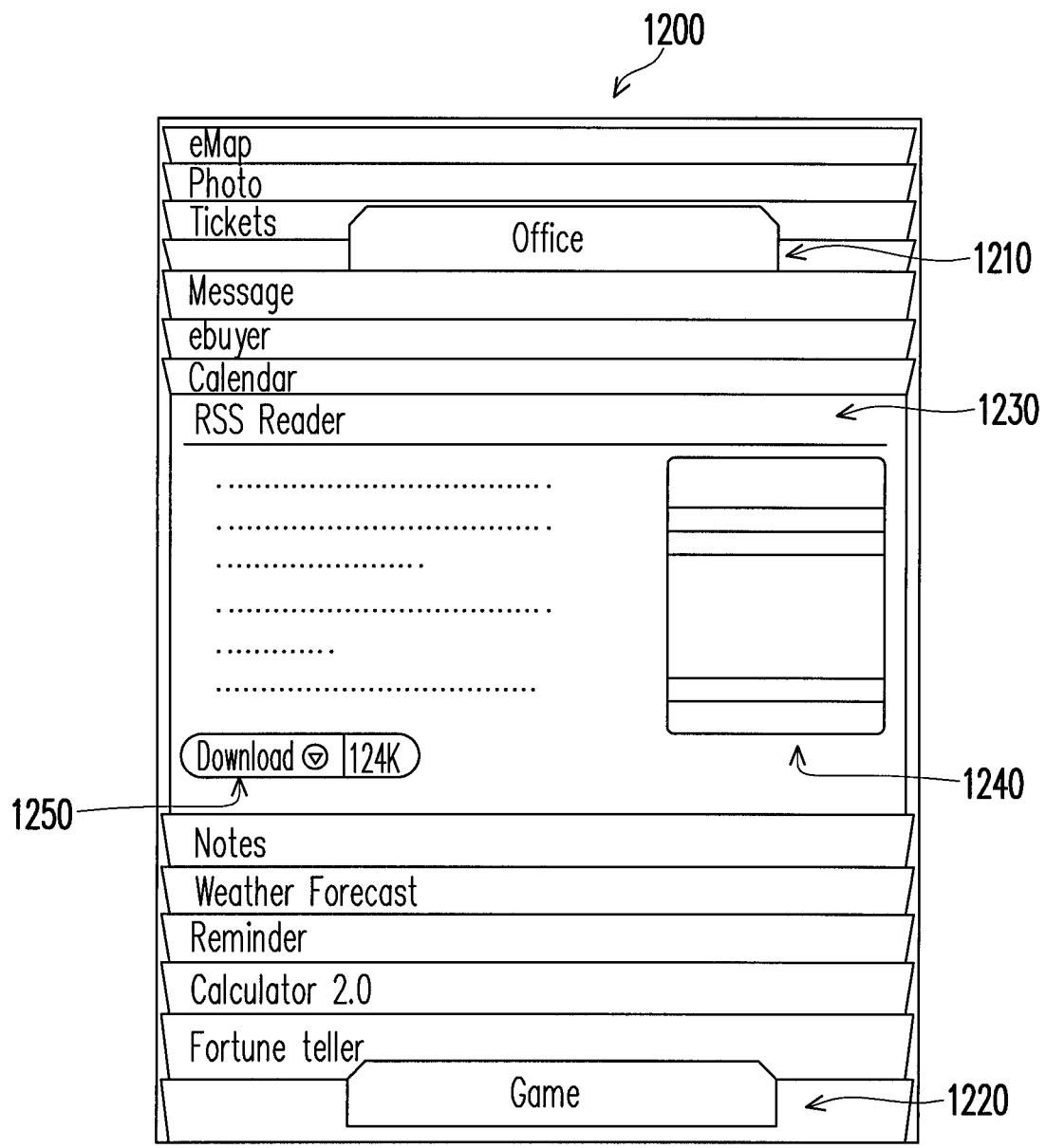
FIG. 12 is a schematic diagram showing a book page download service in the book-like UI of a handheld electronic device according to an embodiment of the present invention.

The virtual book of the handheld electronic device is expandable. The user may connect to a download server through the handheld electronic device to download additional book pages. FIG. 12 is a schematic diagram showing a book page 1200 providing access to the download server. The book page 1200 represents the downloadable book pages in the form of the cards of a library catalog. The cards are arranged as a stack. Each card is corresponding to a downloadable book page. The user may scroll up or scroll down the stack to browse the cards. There are classification cards, such as the cards 1210 and 1220, interleaved in the stack to organize the cards into several categories, such as office applications and games. The downloadable book pages may include various widgets, applications, services, and classification pages.

The middle card in the stack, such as the card 1230 in FIG. 12, shows summary introduction of its corresponding downloadable book page. The middle card 1230 also shows a preview 1240 of its corresponding downloadable book page. The user may click on the preview 1240 with a finger to see a full-screen view of the UI of the downloadable book page. If the user is interested, he/she may download this book page from the download server by clicking the download button 1250 with a finger. When the download is complete, this book page is added into the virtual book of the handheld electronic device.

FIG. 12 is just an example. In some other embodiments of the present invention, the downloadable book pages may be represented in different ways. For example, the UI in FIG. 12 may be adjusted to have each card show summary introduction and a preview of its corresponding downloadable book pages.

A predetermined number of pages of the virtual book may be reserved for corporate operators of wireless service networks. These operator book pages may provide various services of the operators. For example, one of the operator book pages may display advertisements pushed from one of the operator. Moreover, the pushed advertisement may be updated at predetermined time intervals. The operator book pages are more noticeable to the user and are easier to find than conventional menu options. The operator book pages may be built-in, which already exist when the user purchases the handheld electronic device. If the user wants more operator book pages, he/she may download additional operator book pages from the download server mentioned above.

Figure 13A:
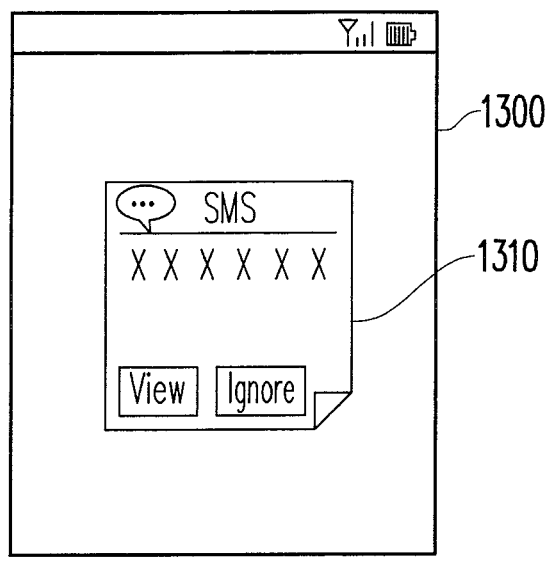
FIGS. 13A-13C are schematic diagrams showing notifications implemented in the book-like UI of a handheld electronic device according to an embodiment of the present invention.
Figure 13B:
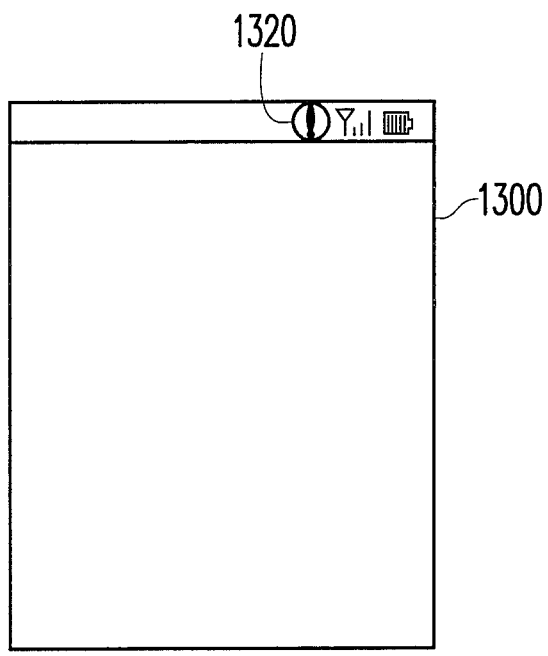

Now please refer to FIG. 13A. FIG. 13A is a schematic diagram showing a book page 1300 and a dialog box 1310. The dialog box 1310 is rendered as a sticky note attached to the book page 1300. The dialog box 1310 notifies the user that there is an incoming short message and asks whether the user would like to view the short message or ignore it for now. If the user chooses to view the short message, the short message is displayed. If the user chooses to ignore the short message, as shown in FIG. 13B, a small icon 1320 appears on top of the book page 1300 to remind the user that there is an unviewed short message. In addition, the handheld electronic device may notify the user of important events, such as an incoming e-mail, an incoming phone call, or the low voltage level of the battery, with a similar sticky note dialog box on the book page.

Figure 13C:
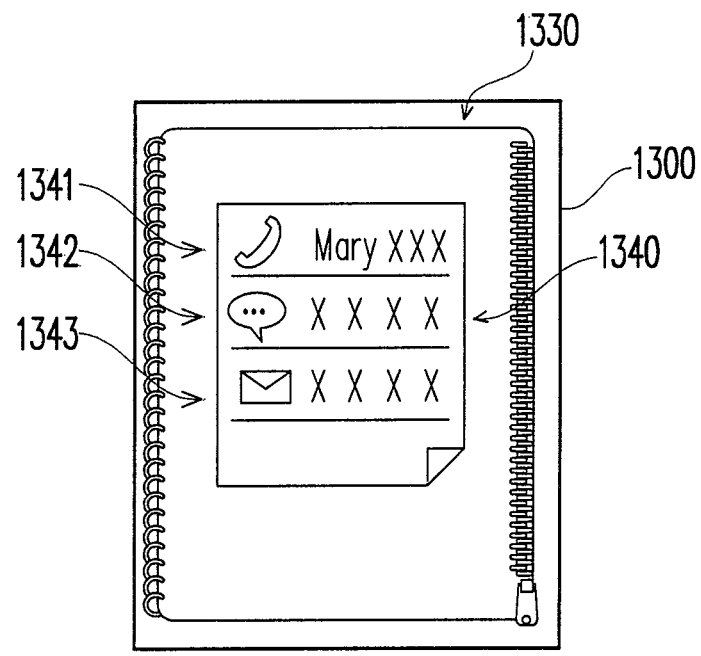

When the handheld electronic device is in the idle mode, the handheld electronic device displays an idle screen which shows the virtual book in the zoom-out view, as shown in FIG. 13C. In the idle screen, the handheld electronic device may notify the user of important events with a sticky note attached to the cover of the virtual book. If there is more than one important event, the handheld electronic device may consolidate them into a single sticky note, as shown in FIG. 13C. In FIG. 13C, the display 1300 of the handheld electronic device shows a virtual book 1330 in the zoom-out view. A sticky note 1340 is attached to the cover of the virtual book 1330. There are several icons on the sticky note 1340 representing various event notification. The icon 1341 stands for an incoming phone call. The icon 1342 stands for an incoming short message. The icon 1343 stands for an incoming e-mail. There may be other icons representing other types of important events.

Figure 14:
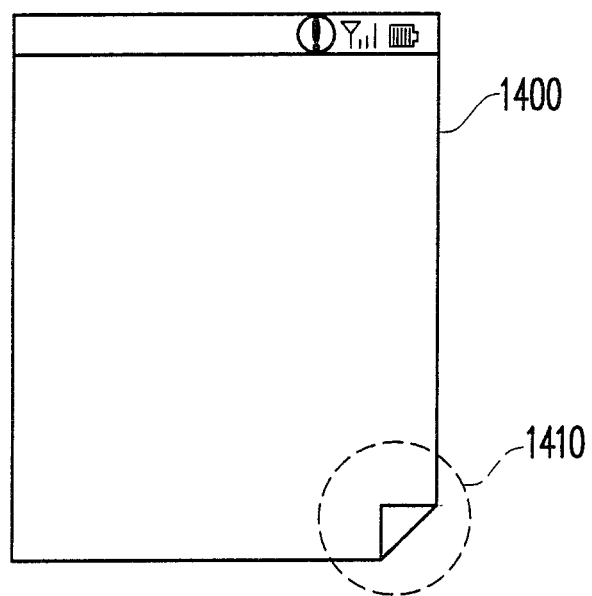
FIG. 14 is a schematic diagram showing a feature for rapid switching between two book pages in the book-like UI of a handheld electronic device according to an embodiment of the present invention.

The virtual book may provide a "fast return" function, which allows the user to switch from a first book page to a second book page and then return to the first book page rapidly. For example, when the user is in a telephone conversation and wants to check the address of a friend, the user may turn to the book page of the address book through the fast return function. FIG. 14 shows the address book page 1400 with a folded corner 1410. The folded corner is displayed by the fast return function. After the address checking, the user may return to the telephone book page rapidly by touching the folded corner 1410 with a finger.

Figure 15:
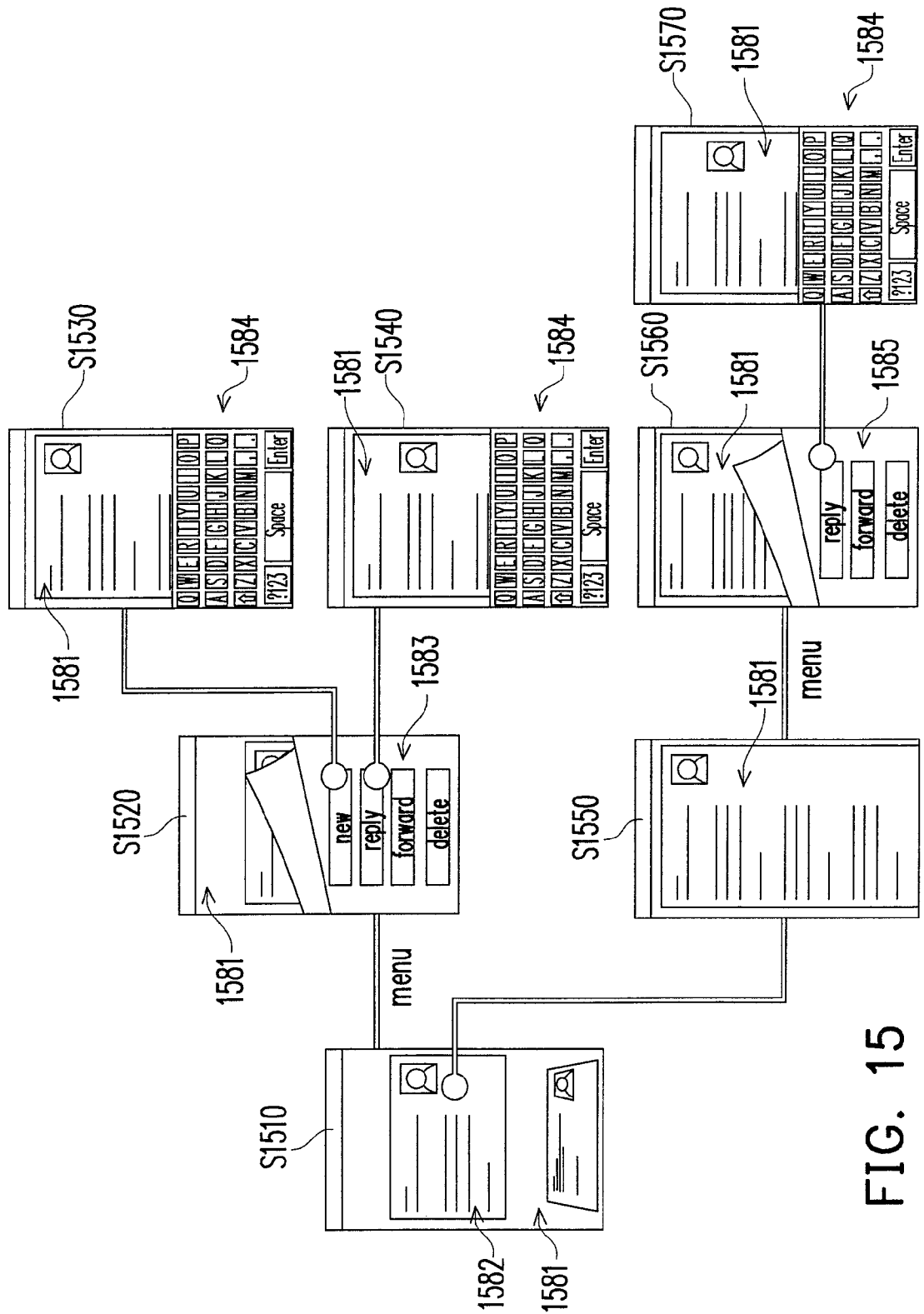
FIG. 15 is a flow chart showing the function menu of a book page in the book-like UI of a handheld electronic device according to an embodiment of the present invention.

FIG. 15 is a flow chart showing the function menu of a book page of the virtual book. The steps S1510-S1570 in FIG. 15 show the UI of a book page 1581 providing short message service (SMS) in different situations. The flow begins at step S1510.

First, the book page 1581 displays a preview of a short message 1582 (step S1510). The user may presses a "sub-menu" button (not shown) to reveal a menu 1583 of the book page 1581 (step S1520). The "sub-menu" button may be a physical button installed on the handheld electronic device, a touch button implemented on the touch panel of the handheld electronic device, or a virtual button displayed on the book page 1581. The menu 1583 is revealed by a visual effect of uncovering the lower part of the book page 1581 and revealing the menu 1583 beneath the book page 1581. The menu 1583 includes four options, namely, creating a new short message (new), replying the short message (reply), forwarding the short message (forward), and deleting the short message (delete). The user may select any one of the options with a finger.

If the user selects the "new" option of the menu 1583, the flow goes to step S1530. The handheld electronic device displays a keyboard 1584 for the user to enter a new short message. If the user selects the "reply" option of the menu 1583, the flow goes to step SI 540. The handheld electronic device displays the keyboard 1584 for the user to reply to the short message 1582.

If the user touches the short message 1582 with a finger at step S1510, the flow goes to step S1550. The handheld electronic device displays the entire short message 1582 for viewing. The user may presses the "sub-menu" button to reveal another menu 1585 of the book page 1581 (step S1560). Similarly, the menu 1585 is revealed by a visual effect of uncovering the lower part of the book page 1581. The menu 1585 includes three options, namely, replying the short message (reply), forwarding the short message (forward), and deleting the short message (delete). The user may select any one of the options with a finger. If the user selects the "reply" option, the flow goes to step S1570. The handheld electronic device displays the keyboard 1584 for the user to reply to the short message 1582.

Each page of the virtual book may reveal its own function menu in the way mentioned above. The functions menus of the book pages may be different according to the functions and services provided by the book pages.

It will be apparent to those skilled in the art that various modifications and variations can be made to the structure of the present invention without departing from the scope or spirit of the invention. In view of the foregoing, it is intended that the present invention cover modifications and variations of this invention provided they fall within the scope of the following claims and their equivalents.

What is claimed is:

1. A user interface display method adapted for an electronic device including a processor, comprising:
    organizing a plurality of computer programs executable on the electronic device into a virtual book, wherein each page of the virtual book comprises a user interface of one of the computer programs;
    downloading a new computer program from a download server, wherein the step of downloading the new computer program comprises:
    using the processor to connect to the download server;
    displaying a plurality of virtual objects, wherein each of the virtual objects represents an executable computer program stored in the download server; and
    in response to a first operating action of the user on one of the virtual objects, downloading the executable computer program represented by that particular virtual object as the new computer program;
    adding a new page into the virtual book, wherein the new page comprises a user interface of the new computer program; and
    displaying the new page so that the user interface of the new page is accessible to a user of the electronic device;
    wherein at least one of the virtual objects comprises a summary introduction of the corresponding executable computer program and a preview of a user interface of the corresponding executable computer program; and
    wherein at least one of the pages is a classification page comprising a plurality of entries and each of the entries represents one of the pages between the classification page and another classification page or a bottom cover of the virtual book.

2. The user interface display method of claim 1, wherein the virtual objects are displayed on one of the pages of the virtual book.

3. The user interface display method of claim 1, wherein each of the virtual objects is displayed in a form of a card of a library catalog and the cards are arranged as a card stack.

4. The user interface display method of claim 3, further comprising:
    displaying a classification card in the card stack, wherein the classification card organizes the cards into a plurality of categories.

5. The user interface display method of claim 1, further comprising:
    displaying a full-screen view of the user interface of the corresponding executable computer program in response to a second operating action of the user on the preview.

6. The user interface display method of claim 1, wherein the virtual object comprising the summary introduction and the preview further comprises a download button and the first operating action is performed on the download button.

7. The user interface display method of claim 1, further comprising:
    in response to a third operating action of the user on one of the entries, displaying the page represented by that particular entry.

8. An electronic device, comprising:
    a touch panel;
    a display;
    a processor; and
    a memory, storing program codes, and the processor performs the program codes to:
        organizes a plurality of computer programs executable on the electronic device into a virtual book, each page of the virtual book comprises a user interface of one of the computer programs;
        senses movement and/or pressure caused by a user of the electronic device on the touch panel and interprets the movement and/or the pressure as operating actions of the user on the virtual book;
        downloads a new computer program from a download server, wherein the step of downloading the new computer program comprises:
    connecting to the download server;
        displaying a plurality of virtual objects on the display, wherein each of the virtual objects represents a downloadable computer program stored in the download server; and
        in response to a first operating action of the user on one of the virtual objects, downloading the downloadable computer program represented by that particular virtual object as the new computer program;
        adding a new page into the virtual book, wherein the new page comprises a user interface of the new computer program; and
        displaying the new page on the display so that the user interface of the new page is accessible to the user;
        wherein at least one of the virtual objects comprises a summary introduction of the corresponding downloadable computer program and a preview of a user interface of the corresponding downloadable computer program; and
        wherein at least one of the pages is a classification page comprising a plurality of entries and each of the entries represents one of the pages between the classification page and another classification page or a bottom cover of the virtual book.

9. The electronic device of claim 8, wherein the virtual objects are displayed on one of the pages of the virtual book.

10. The electronic device of claim 8, wherein each of the virtual objects is displayed in a form of a card of a library catalog and the cards are arranged as a card stack.

11. The electronic device of claim 10, wherein the processor performs the program codes further to:
   displays a classification card in the card stack and the classification card organizes the cards into a plurality of categories.

12. The electronic device of claim 8, wherein the processor performs the program codes further to:
   displays a full-screen view of the user interface of the corresponding downloadable computer program on the display in response to a second operating action of the user on the preview.

13. The electronic device of claim 8, wherein the virtual object comprising the summary introduction and the preview further comprises a download button and the first operating action is performed on the download button.

14. The electronic device of claim 8, wherein the processor performs the program codes further to:
   display the page represented by that particular entry on the display in response to a third operating action of the user on one of the entries.

\* \* \* \* \*